(12) United States Patent
Nudo et al.

(10) Patent No.: US 6,913,667 B2
(45) Date of Patent: Jul. 5, 2005

(54) COMPOSITE STRUCTURAL PANEL AND METHOD

(76) Inventors: Thomas Nudo, 20 Hickory Ridge La., Springfield, IL (US) 62707; Denise M. Nudo, 20 Hikory Ridge La., Springfield, IL (US) 62707

( * ) Notice: Subject to any disclaimer, the term of this patent is extended or adjusted under 35 U.S.C. 154(b) by 138 days.

(21) Appl. No.: 10/387,421

(22) Filed: Mar. 14, 2003

(65) Prior Publication Data

US 2004/0177590 A1 Sep. 16, 2004

(51) Int. Cl.$^7$ .............................................. B32B 31/00
(52) U.S. Cl. ..................... 156/254; 156/264; 156/311; 156/312; 156/517; 156/519; 156/552; 156/522; 156/563; 52/73.1; 52/783.1
(58) Field of Search .................................. 156/264, 311, 156/312, 517, 519, 522, 552, 563, 254, 263, 559, 518, 580; 52/73.1, 783.1; 428/116, 118, 72, 73

(56) References Cited

U.S. PATENT DOCUMENTS

| | | | | |
|---|---|---|---|---|
| 1,594,889 A | * | 8/1926 | Loetscher | 144/351 |
| 4,879,152 A | * | 11/1989 | Green | 428/73 |
| 5,674,593 A | * | 10/1997 | Earl | 428/182 |
| 5,776,580 A | * | 7/1998 | Rasmussen et al. | 428/74 |
| 5,914,175 A | * | 6/1999 | Nudo et al. | 428/178 |
| 6,506,276 B1 | * | 1/2003 | Court et al. | 156/251 |

* cited by examiner

Primary Examiner—Linda Gray
(74) Attorney, Agent, or Firm—Rosenberg, Klein & Lee

(57) ABSTRACT

A composite structural panel (10) is provided, where the composite structural panel (10) includes a central honeycomb layer (16) having a plurality of box-like channels extending therethrough along a vertical direction. The honeycomb layer (16) is sandwiched between bonding layers (18) formed from a porous reinforcement material. Exterior support layers (22) are bonded or laminated to respective bonding layers (18) by adhesive layers (20). The one-piece composite structural panel is then positioned on an exterior surface of a building (12) and structurally fixed to a building stud or other building element.

9 Claims, 5 Drawing Sheets

COMPOSITE STRUCTURAL PANEL AND METHOD

BACKGROUND OF THE INVENTION

1. Field of the Invention

The subject invention relates to structural panels generally adapted to be mounted on commercial and domestic edifices and other structures.

In particular, the subject invention pertains to a composite structural panel which is adapted to be easily secured to an external or internal base structure.

Still further, the subject invention relates to a composite structural panel which is of relatively lightweight and structurally formed to accept the force bearing loads associated with external environmental loads.

Further, the subject invention pertains to a composite structural panel which is highly thermally insulative and protects the structure from extreme external environment conditions associated with rain, wind erosion, temperature fluctuations, and associated external environmental parameters.

The subject invention relates to a composite structural panel to be mounted to a base surface and provide protection from environmental elements. In particular, the present invention directs itself to a composite structural panel formed of laminated members which are adapted for placement on the exterior of buildings or other edifices or structures. More particularly, this invention directs itself to a composite structural panel having a central honeycomb layer formed of a plastic material and having box-like channels formed therethrough and being sandwiched between a pair of bonding layers.

Further, the bonding layers are formed from a porous reinforcement material. Additionally, this invention directs itself to a composite structural panel having a pair of support surfaces which are, respectively, laminated to the bonding layers of the composite structural panel.

2. Prior Art

Laminated panels are well-known in the art. In general, such prior art panels include some type of core material with a skin coating. In many instances, the problems of such prior art panels are that the panels are formed of materials which do not bond efficiently with one another and, thus, are not structurally sound, nor do they allow for extended use. Often, expansion of the panels due to environmental conditions, such as temperature, will cause structural problems in the building to which the panels are affixed. Additionally, mechanical stresses, such as uneven loads placed on the panels, may cause the panels to tear apart. It is a purpose of the subject invention to provide a combination of elements making up a composite structural panel which allows for efficient and strong bonding between the outer structural layers which are laminated to, or otherwise bonded to, a central honeycomb layer. The problems associated with expansion or mechanical stress on the panels are easily overcome through the effective bonding of the laminated layers to the central core layer.

In some prior art structural panels, the overall structure is formed of flat panels which are laminated to each other in solid construction. Such prior art panels are generally relatively heavy and do not take advantage of the thermal insulative properties of honeycomb structures.

In other prior art designs where honeycomb structures are used, there is a problem in forming a structurally secure system which is sturdy enough to withstand the loads applied thereto.

SUMMARY OF THE INVENTION

The present invention provides for a composite structural panel which is adapted to be mounted to a base surface for providing environmental protection. The composite structural panel is formed of a central honeycomb core layer having a pair of bonding layers adhered thereto. The central core layer is honeycombed with a plurality of box-like contoured channels. The bonding layers are formed of a suitable porous reinforcement material. The panel is then sandwiched between a pair of structural layers, formed of metal or other suitable material, which are bonded or laminated to the bonding layers. The bonding layers allow for effective and strong bonding between the central core layer and the outer structural panel layers.

It is a principle objective of the subject composite structural panel to provide a laminated panel structure which is adapted to be mounted to a building or other structure for protection from the elements.

It is a further objective of the subject composite structural panel to provide a composite panel structure which allows for effective thermal insulation from the elements.

It is a further objective of the subject invention to provide composite structural panels having a central honeycomb core layer.

It is a further objective of the subject invention concept to provide composite structural panels having a pair of bonding layers between which the honeycomb central core layer is sandwiched.

It is an important objective of the present invention to provide a pair of structural layers which are laminated or otherwise bonded to the pair of bonding layers of the subject panel structure.

It is a further important objective of the present invention to provide a composite structural panel which permits fabrication of the panel off-site of a construction site. The subject panel may be brought to the construction site and mounted to the edifice or other structure in a minimal amount of time with a resulting saving of labor and construction costs.

DESCRIPTION OF THE PREFERRED EMBODIMENTS

Figure 1:
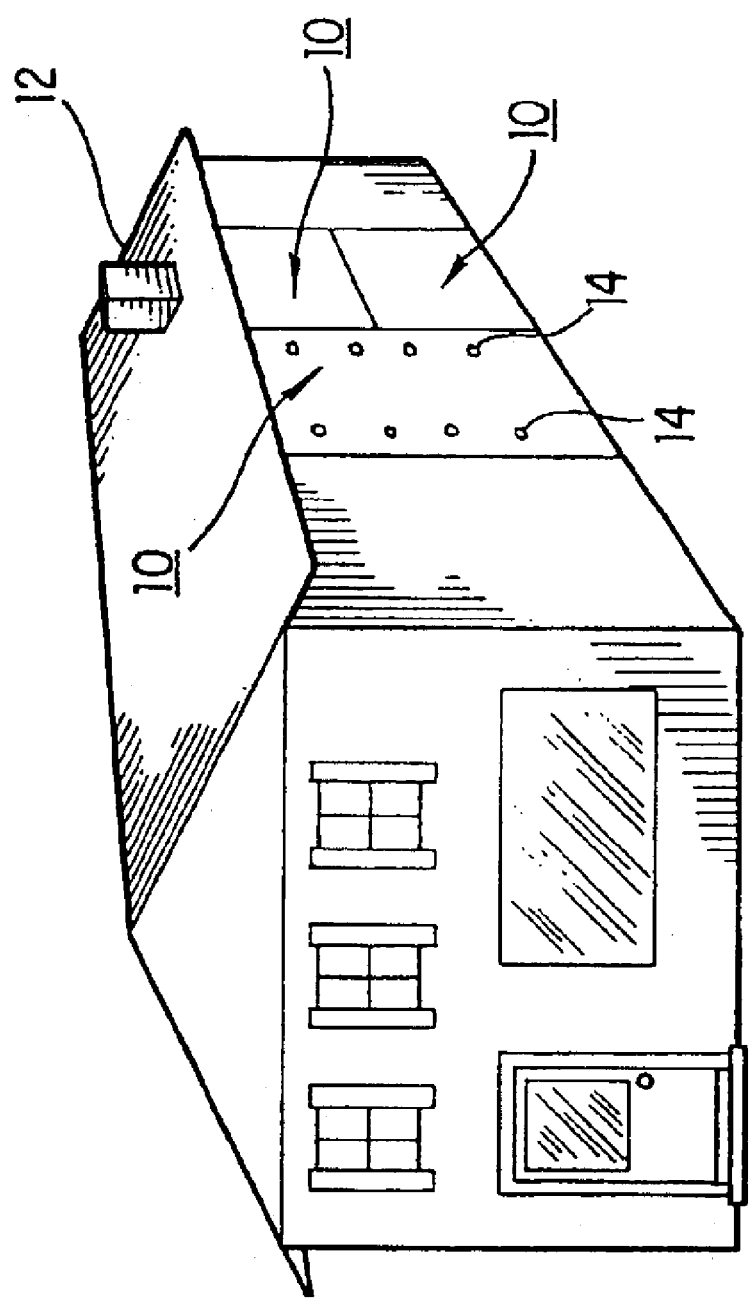
FIG. 1 is a perspective view of the subject composite structural panel mounted to a building structure.

Referring now to FIGS. 1–4, there is shown composite structural panels 10, which are applied to the exterior of a building or other edifice 12 for purposes of providing exterior paneling for building 12. In general, the exterior paneling of building 12 is formed by a plurality of mating composite structural panels 10 positioned in contiguous contact, each with respect to the other, in order to provide the exterior paneling for building 12. Although FIG. 1 illustrates panels 10 being applied to building or edifice 12, the structural panels 10 may be used in the construction of shipping containers, truck trailers, airplanes, buildings, boats, and yachts, computer room flooring, signs, or for any other structures requiring lightweight, structurally sound and thermally insulative panels.

The structural panels 10, as shown in FIG. 1, are designed to optimize the thermal insulation for the interior of building 12, or any other structure composed of building panels 10. Through use of the honeycomb structure (as will be detailed in following paragraphs), use is made of air which provides a low thermal conductivity and reduces heat transport to permit wide fluctuations of temperature external to building 12 while maintaining a lower temperature fluctuation internal to building 12. Additionally, the laminated structure as will be described in following paragraphs provides for a relatively high structural strength to accept the external loads bearing thereon. The composite structural panels 10 are further constructed to permit a lightweight, structurally sturdy, and robust panel which accepts bearing loads applied thereto as part of the overall edifice structure.

The composite structural panels 10 are generally formed off-site and are transported to the building site in one-piece formation for mounting to the exterior of building 12. In this manner, labor costs are reduced and exterior paneling may be mounted and located on building 12 in a minimum amount of time to provide paneling which includes the advantages of being structurally sound and further minimizes the costs to the consumer. Additionally, the composite structural panels 10 are formed from light-weight materials and materials which provide thermal insulative properties. The panels 10 provide thermal insulation for building 12 and also provide for structural strength and stability of the edifice 12 while minimizing the overall weight of the construction.

The composite structural panel 10 may be mounted to the exterior of building 12 by using threaded engagement elements, such as screws or other types of fastening devices 14. In this manner, an entire composite structural panel 10 may be easily mounted to the exterior of building 12 in a minimum amount of time. The fastening elements 14 are secured to interior structural elements of building 12 (not shown), such as studs or other interior structural elements. Although FIG. 1 illustrates composite structural panels 10 being used in the construction of building 12, the panels 10, along with the fastening elements 14, may be utilized in the construction of any structure, such as shipping containers or truck trailers, for example, requiring the lightweight, thermally insulative and structurally sound properties of composite structural panels 10.

In this manner, a modular type of exterior paneling system is provided which allows the contractor or other user to simply mount composite structural panels 10 adjacent each other in abutting or non-abutting relationship and fasten such to the interior structure of building 12. Composite structural panels 10, subsequent to construction and mounting, provide a substantially seamless overall structure as part of the exterior paneling of building 12. Once composite building panels are mounted to the exterior of building 12, where abutting edges are provided are generally adhesively taped and a finish coating is placed over the composite structural panels 10 in a manner similar to the interior drywall of building 12.

Figure 2:
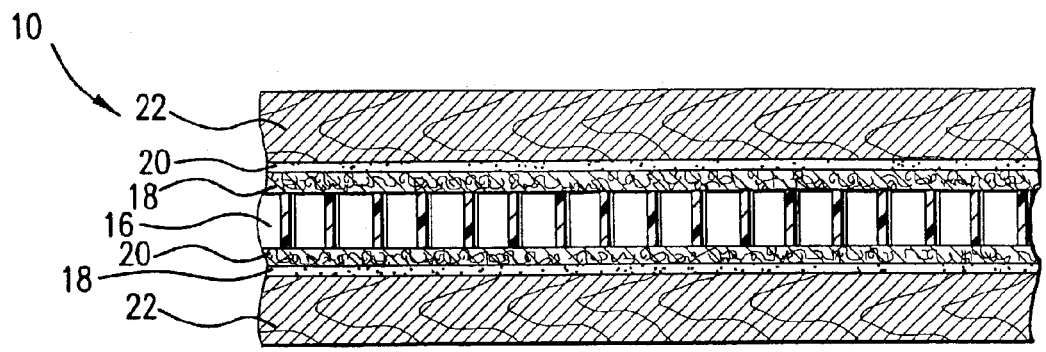
FIG. 2 is a side view of the composite structural panel.
Figure 3:
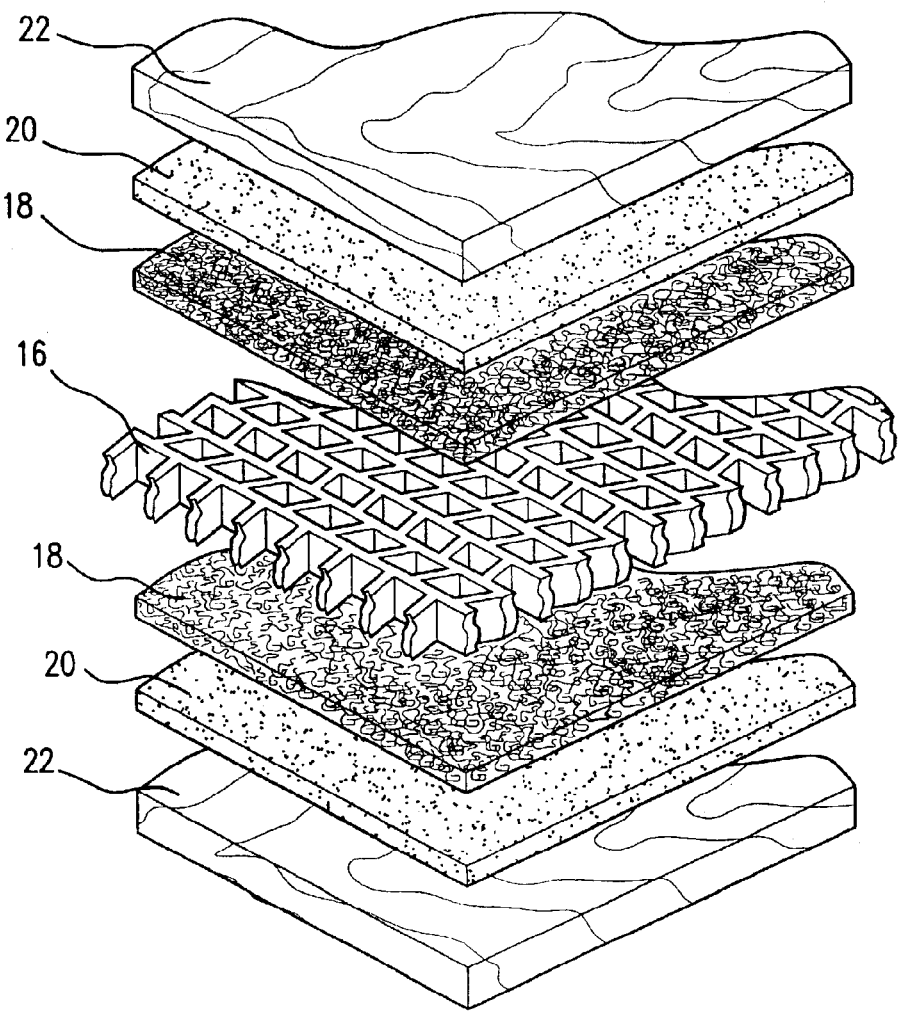
FIG. 3 is an exploded view of the composite structural panel.
Figure 4:
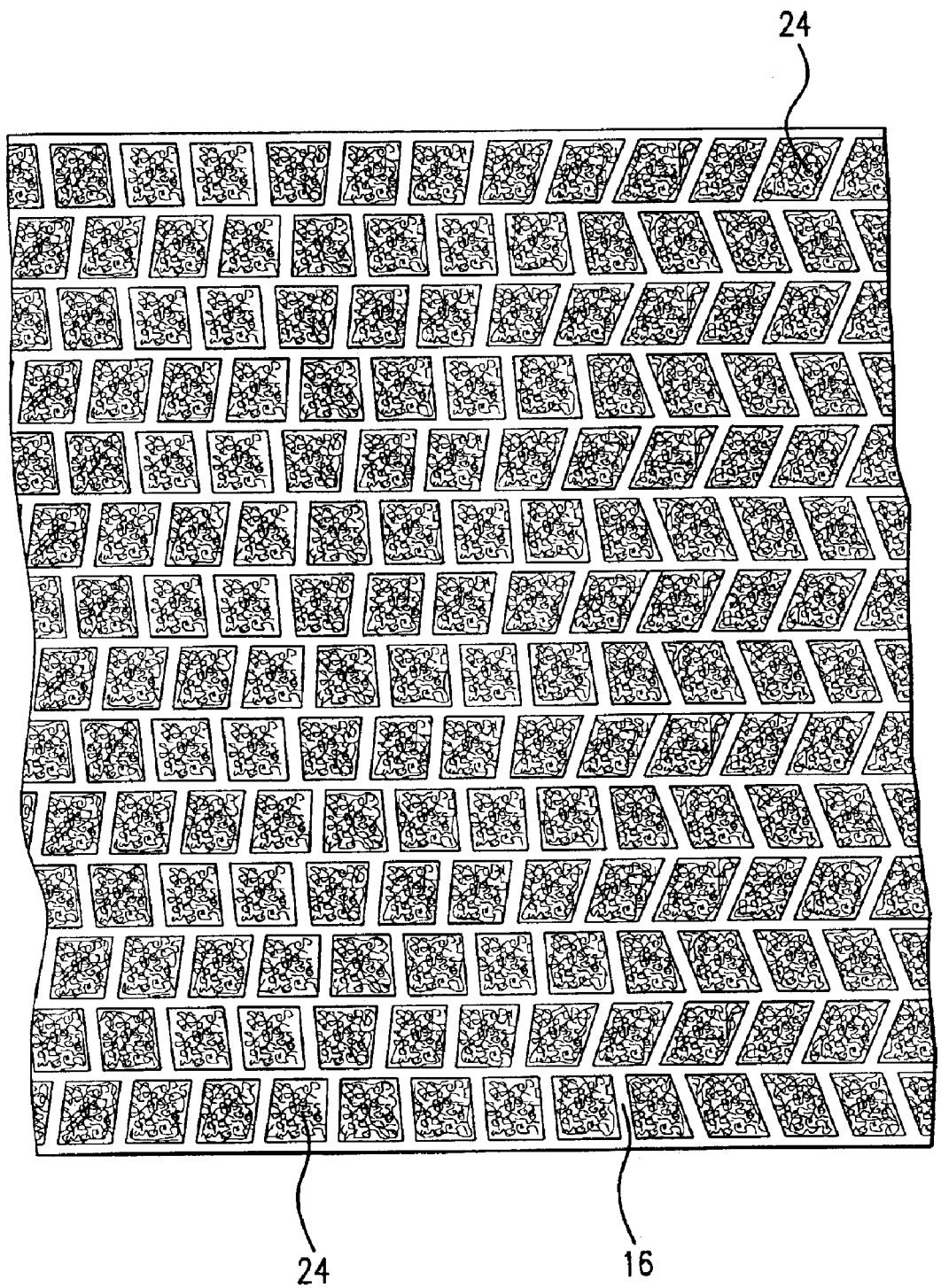
FIG. 4 is a top view of the composite structural panel.

As shown in FIGS. 2 and 3 of the Drawings, the composite structural panel 10 includes a honeycomb layer 16 sandwiched between bonding layers 18. The honeycomb layer 16 may be formed from a relatively structurally robust, thermally insulative plastic material, such as polyethylene or polyvinyl chloride, or like material. As shown in FIGS. 3 and 4, the honeycomb layer 16 is formed with a plurality of box-like contoured channels 24 extending therethrough along a vertical direction. The contoured channels 24 may be positioned in rows or other regular patterns, as shown in FIG. 4, or may be selectively arranged depending upon the structural needs of the manufacturer.

Although shown as being substantially rectangular in cross-section, the box-like channels 24 of honeycomb layer 16 may have any shape, configuration or contour, depending upon the structural and insulative needs of the user and manufacturer. Similarly, the wall thickness between adjacent channels 24 may be selectively chosen, along with the vertical thickness of the honeycomb layer 16 itself, depending upon the user's needs. The selectivity of shapes and dimensions of both the channels 24 and the thicknesses of the walls and of the vertical height of the honeycomb layer 16 may be chosen during the manufacturing process, illustrated in FIG. 5.

Referring to FIGS. 2 and 3, honeycomb layer 16 is sandwiched between a pair of bonding layers 18. The bonding layers 18 are generally planar in contour and are mounted on an upper surface/lower surface of honeycomb layer 16 respectively. The bonding layers may be formed of spun woven polyester, fiberglass, or any other suitable porous reinforcement material. The bonding layers 18 are melted onto honeycomb layer 16 to both bond the material of layers 18 to the honeycomb material 18 and further to cover the individual channels 24 of the honeycomb layer 16.

Structural layers 22, as shown in FIGS. 2 and 3, are then bonded to the bonding layers 18 by adhesive layers 20. The structural layers 22 are formed from high strength materials, such as aluminum, fiber-reinforced plastics, plywood, steel, or other desired structural material. The adhesive layers 20 may be formed of glue or other suitable adhesive material known in the art for bonding the structural layers 22 to the bonding layers 18.

Figure 5:
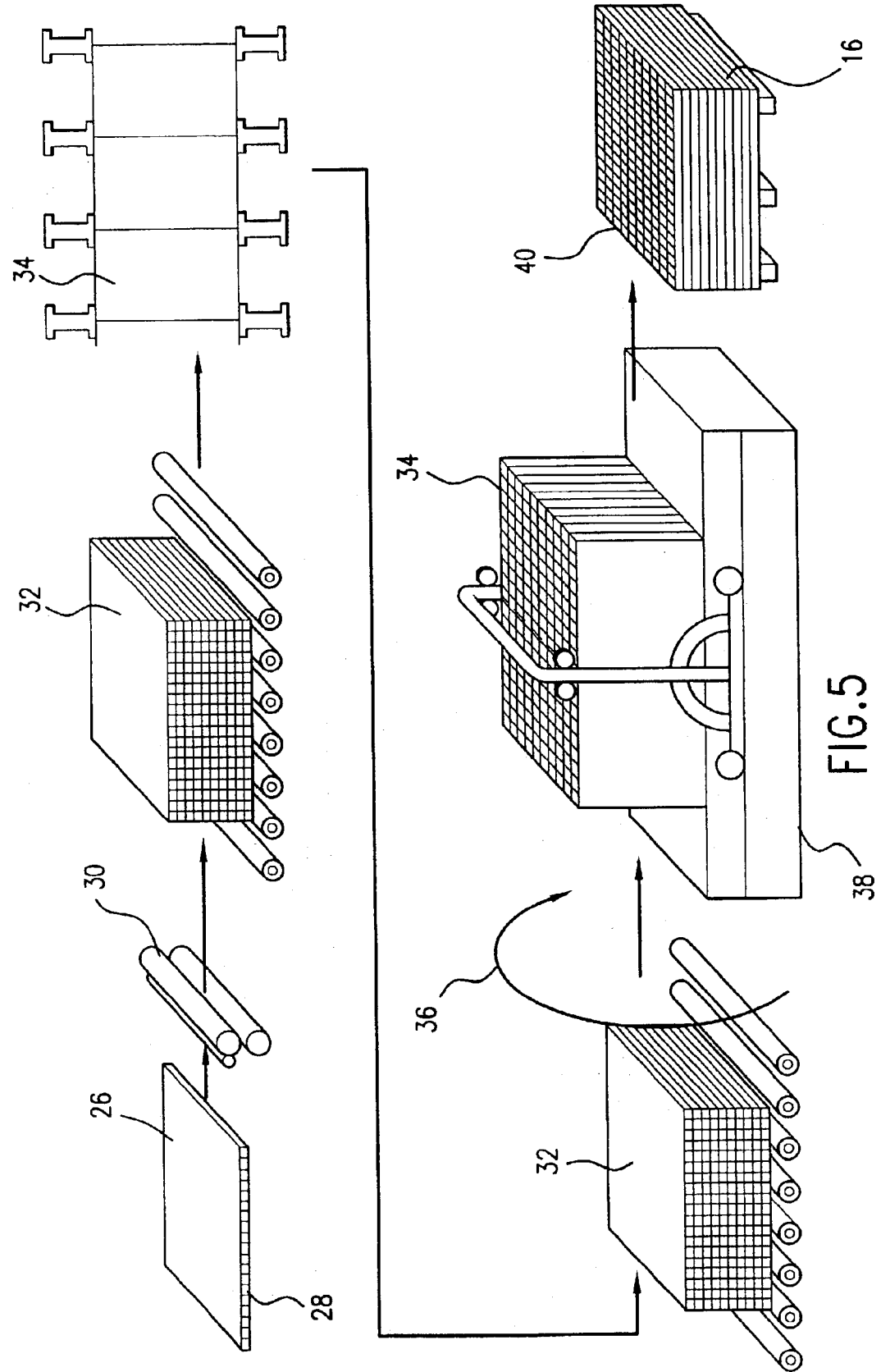
FIG. 5 is a schematic diagram showing the formation method of the honeycomb layer of the composite structural panel; and, FIG. 6 is a schematic diagram illustrating the production method for the composite structural panel.

FIG. 5 illustrates the formation method of honeycomb layers 16. A base sheet 26 of plastic is inserted into glue or adhesive spreader 30 which is substantially shown as a pair of rollers which permit even coating of the base sheet 26 as it passes between the roller elements. Such spreaders 30 are well-known in the art and are commercially available. The base sheet of plastic is formed with channels 28 extending therethrough. The channels 28 extend along a horizontal direction and are positioned substantially parallel with respect to one another. The channels 28 will eventually form channels 24 and have sizes, contours, and dimensions selectively chosen by the manufacturer, depending upon the structural and insulative needs of the manufacturer and user.

Glue spreader or first adhesive spreader 30 applies an adhesive to the upper and lower surfaces of the base sheet 26. From the glue spreader 30, the base sheets 26 are stacked to form the first stack of base sheets 32. This stack is transported, by conveyor belt or other suitable means, to a hydraulic or pneumatic press 34. The hydraulic or pneumatic press 34 compresses the stack 32 and strengthens the adhesion between the individual base sheets 26.

Following compression, the stack 32 is rotated through 90°, illustrated by directional arrow 36. This rotation results in the channels 28 of the stack 32 now being positioned in the vertical direction. The rotated stack 34, having channels 28 positioned vertically, is then transferred to saw deck 38. The saw deck 38 is any standard type of cutting saw and cuts rotated stack 34 in the horizontal direction to form a new stack 40 of individual honeycomb layer panels 16. The cutting process of saw deck 38 may cut the panels 16 to any desired thickness.

Figure 6:
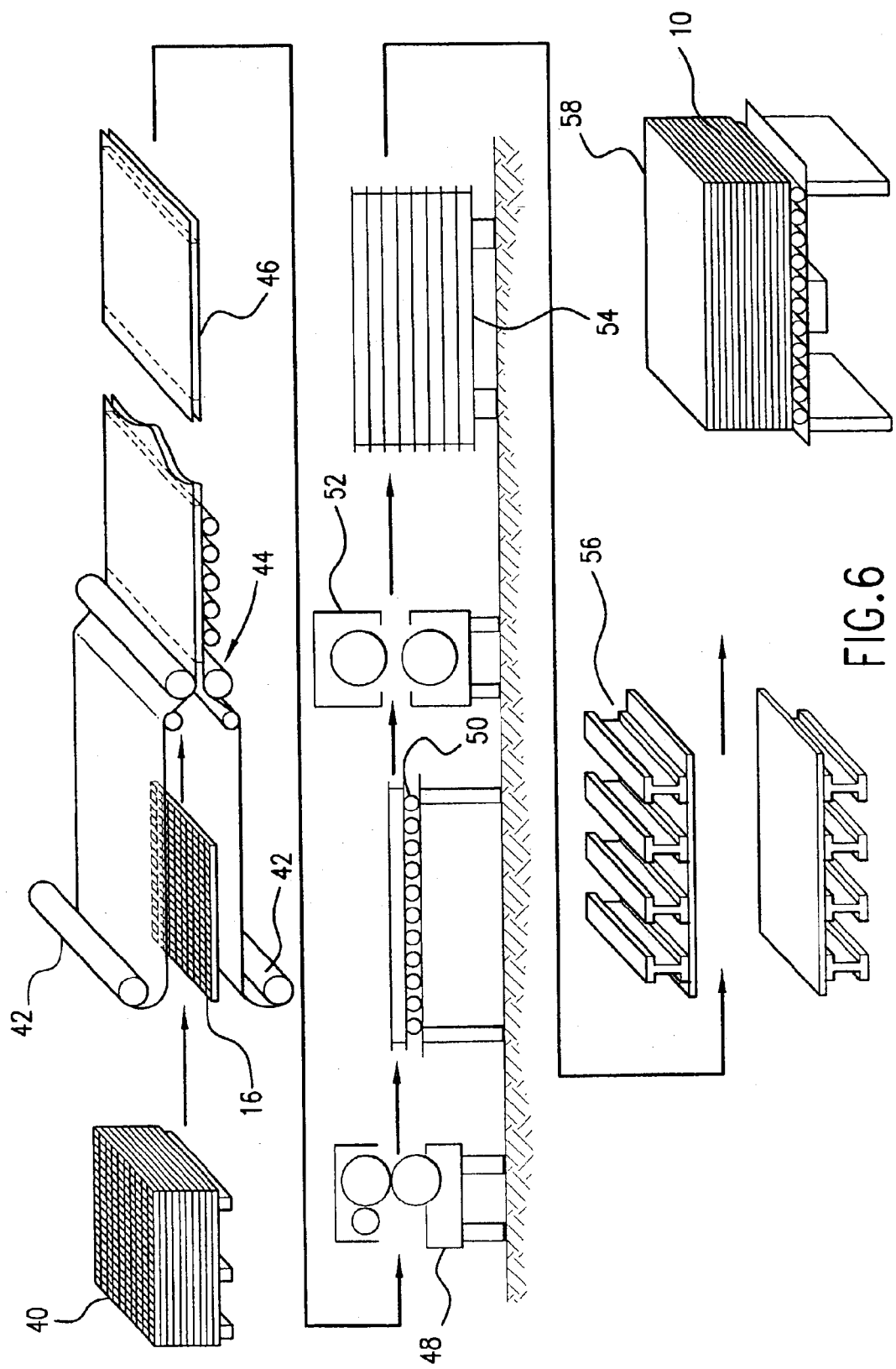

Honeycomb layer 16 is sandwiched between bonding layers 18 and may be formed of spun woven polyester, fiberglass, or any other suitable porous reinforcement material as previously described. As shown in FIG. 6 of the Drawings, the honeycomb layer panels 16 of stack 40 are individually passed between rolls 42 of the bonding layer material. Bonding or adhesive layers 18 are applied to upper and lower surfaces of the honeycomb layer 16 from rolls 42 and are then passed through high temperature roller press 44. The high temperature roller press 44 melts the reinforced film 18 onto the upper and lower surfaces of the plastic honeycomb layer 16, being bonded to both the walls of the honeycomb layer 16 and also covering the individual channels 24.

Structural layers 22 are bonded to the bonding layers 18, respectively, by respective adhesive layers 20. The exterior structural layers are formed from high strength materials, such as aluminum, fiber reinforced plastics, plywood, steel, or any other desired structural material. Generally, metallic layers, such as aluminum and steel, and other high strength materials, such as plastics and wood, do not bond easily to other plastic materials, such as the plastic material forming honeycomb layer 16. The high-strength materials of the structural layers 22, however, may be easily, effectively, and efficiently bonded to the porous material of bonding layers 18.

As shown in FIG. 6, once the reinforced film 18 has been melted onto the faces of the plastic honeycomb layer 16 to form a bonded honeycomb structure 46, the bonded honeycomb structure 46 is passed through the second adhesive spreader 48. The second adhesive spreader 48 applies adhesive layers 20 to the upper and lower surfaces of the bonded honeycomb structure 46. At station 50, the outer support layers 22 are then applied to the bonded honeycomb structure 44 with the adhesive layers 20 adhering or laminating the panels 22 to the bonding layers 18.

As shown in FIG. 6, once the outer panels 22 have been laminated to the structure 46, the composite structural panel is passed through rotary press 32 to compress the various layers and ensure proper bonding and sealing of all the layers, each to the other. From rotary press 52, the individual panels 10 are stacked to form stack 54.

The stack 54 is then further compressed by hydraulic or pneumatic cold press 56. The compression of the stack 54 by cold press 56 ensures optimal bonding, sealing and compression of all layers. Following compression, the panels are moved from cold press 56 to form a stack 58 of individual panels 10, which, when the adhesives are fully dried, are ready for use in the exterior paneling of building 12.

The composite structural panels 10 may be constructed off-site from the construction of building 10. In addition to the portability and convenience provided by the off-site construction of panels 10, the panels 10, by virtue of the honeycomb layer 16 and the materials chosen for the composite layers, offer optimal thermal insulative abilities coupled with structural strength and stability and minimal weight.

Although this invention has been described in connection with specific forms and embodiments thereof, it will be appreciated that various modifications other than those discussed above may be resorted to without departing from the spirit or scope of the invention. For example, functionally equivalent elements may be substituted for those specifically shown and described, proportional quantities of the elements shown and described may be varied, and in the formation method steps described, particular steps may be reversed or interposed, all without departing from the spirit or scope of the invention as defined in the appended claims.

What is claimed is:

1. A method of fabricating composite structural panels comprising the steps of:

(a) inserting a plurality of base sheets into a first adhesive spreader, said base sheets each having a plurality of substantially parallel channels being formed therethrough and extending along a horizontal direction;

(b) applying a first adhesive to upper and lower surfaces of each of said plurality of base sheets;

(c) stacking said base sheets to form a base block having a plurality of honeycombed substantially box-shaped channels extending therethrough in said horizontal direction;

(d) rotating said base block 90° to orient said honeycombed substantially box-shaped channels in a vertical direction;

(e) cutting said base block along said horizontal direction to form a plurality of honeycomb layers;

(f) sandwiching each said honeycomb layer between upper and lower bonding layers; and, (g) laminating upper and lower support layers to respective ones of said upper and lower bonding layers to form a composite structural panel.

2. The method of fabricating composite structural panels as recited in claim 1 wherein said step of sandwiching each said honeycomb layer between said upper and lower bonding layers is followed by insertion of each said honeycomb layer and said respective upper and lower bonding layers into a high-temperature roller press to bond said upper and lower bonding layers to said honeycomb layer to form a bonded honeycomb structure.

3. The method of fabricating composite structural panels as recited in claim 2 wherein said step of insertion of each of said honeycomb layers into said high-temperature roller press is followed by insertion of each of said bonded honeycomb structures into an adhesive spreader.

4. The method of fabricating composite structural panels as recited in claim 3 wherein said step of insertion of each of said bonded honeycomb structures into said adhesive spreader is followed by application of upper and lower adhesive layers to said bonded honeycomb structure.

5. The method of fabricating composite structural panels as recited in claim 1 wherein said step of lamination of said upper and lower support layers is followed by insertion of each of said composite structural panels into a rotary press.

6. The method of fabricating composite structural panels as recited in claim 5 wherein said step of insertion of each of said composite structural panels into said rotary press is followed by compression of each of said composite structural panels.

7. The method of fabricating composite structural panels as recited in claim 6 wherein said step of compressing each of said composite structural panels is followed by stacking of said composite structural panels to form a stack of composite structural panels.

8. The method of fabricating composite structural panels as recited in claim 7 wherein said step of stacking said composite structural panels is followed by insertion of said stack of composite structural panels into a cold press.

9. The method of fabricating composite structural panels as recited in claim 8 wherein said step of insertion of said stack of composite structural panels into said cold press is followed by compression of said stack of composite structural panels.

* * * * *